(12) United States Patent
Li et al.

(10) Patent No.: US 10,390,180 B1
(45) Date of Patent: Aug. 20, 2019

(54) GEOLOCATION DETERMINATION WITH POWER FINGERPRINTING

(71) Applicant: NetScout Systems, Inc., Westford, MA (US)

(72) Inventors: Ziming Li, Hercules, CA (US); Ricardo Salinas Carlin, El Sobrante, CA (US)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 15/986,694

(22) Filed: May 22, 2018

(51) Int. Cl.
*H04W 4/029* (2018.01)
*H04W 24/10* (2009.01)

(52) U.S. Cl.
CPC .......... *H04W 4/029* (2018.02); *H04W 24/10* (2013.01)

(58) Field of Classification Search
CPC ..... H04W 4/023; H04W 4/027; H04W 4/029; H04W 4/14; H04W 24/10; H04W 64/00; H04W 4/025; H04W 16/18; H04W 24/02; H04W 64/006; H04W 4/02; H04W 24/04; H04W 36/32; H04W 36/30; H04W 64/003; H04W 52/028; H04W 52/241; H04W 52/242; H04W 52/265; H04W 68/02
See application file for complete search history.

(56) References Cited

U.S. PATENT DOCUMENTS

| 6,539,221 B1* | 3/2003 | Vasudevan | H04W 16/18 455/423 |
|---|---|---|---|
| 2011/0177831 A1* | 7/2011 | Huang | H04W 64/003 455/457 |
| 2013/0005349 A1* | 1/2013 | Sanders | G01S 3/30 455/456.1 |
| 2013/0040648 A1* | 2/2013 | Yang | H04W 16/18 455/446 |
| 2015/0045043 A1* | 2/2015 | Chou | H04W 16/18 455/446 |
| 2017/0353827 A1* | 12/2017 | D'Alberto | H04W 4/029 |

* cited by examiner

*Primary Examiner* — Daniel Lai
(74) *Attorney, Agent, or Firm* — Locke Lord LLP; Scott D. Wofsy; Christopher J. Capelli

(57) ABSTRACT

A method for deriving geolocation of a mobile device within a coverage area of a cellular communication network includes receiving pathloss data and measurement data associated with a plurality of individual sectors within a plurality of individual cells of the cellular communication network. Each of the plurality of individual sectors includes a plurality of geographic bins. Reception power measurements are determined for each of the plurality of geographic bins. A plurality of maps is generated for each of the plurality of individual sectors based on at least one characteristic included in the received pathloss data or measurement data or based on the determined one or more reception power measurements. Geolocation of the mobile device is determined based on the generated plurality of maps.

10 Claims, 8 Drawing Sheets

GEOLOCATION DETERMINATION WITH POWER FINGERPRINTING

FIELD OF THE INVENTION

Embodiments of the present invention relate generally to estimating the location of a wireless mobile device that is in communication with a wireless communication network, and specifically to geolocation determination with power fingerprinting.

BACKGROUND OF THE INVENTION

The increased terminal mobility offered by cellular telephone networks as well as mobile and WiFi radio data networks has brought about an increased demand for location-based services and applications. Location based services include, for example, fleet management, vehicle tracking, tracking for theft recovery, telemetry, emergency services, location identification, navigation, location based information services and location based advertising. A wide variety of technologies for locating mobile devices have been developed.

Typical mobile device location technologies may be classified into external methods and network based methods. One example of an external method is the Global Positioning System ("GPS"). Network based methods may be further categorized depending on whether it is the network or the mobile device that performs necessary signal measurements. These signal measurements may involve the reception time of signals communicated between a base station and a mobile device, the angle of arriving signals or round trip delay measurements of signals communicated between a serving base station and a mobile device, or combinations thereof.

However, for many current and future location based applications, accuracy of the calculated position information should be improved.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for deriving geolocation of a mobile device within a coverage area of a cellular communication network includes receiving pathloss data and measurement data associated with a plurality of individual sectors within a plurality of individual cells of the cellular communication network. Each of the plurality of individual sectors includes a plurality of geographic bins. One or more reception power measurements are determined for each of the plurality of geographic bins. A plurality of maps is generated for each of the plurality of individual sectors based on at least one characteristic included in the received pathloss data or measurement data or based on the determined one or more reception power measurements. Geolocation of the mobile device is determined based on the generated plurality of maps.

In another aspect, a network device for deriving geolocation of a mobile device within a coverage area of a cellular communication network is configured to receive pathloss data and measurement data associated with a plurality of individual sectors within a plurality of individual cells of the cellular communication network. Each of the plurality of individual sectors includes a plurality of geographic bins. The network device is also configured to determine one or more reception power measurements for each of the plurality of geographic bins. The network device is further configured to generate a plurality of maps for each of the plurality of individual sectors based on at least one characteristic included in the received pathloss data or measurement data or based on the determined one or more reception power measurements and to determine geolocation of the mobile device based on the generated plurality of maps.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
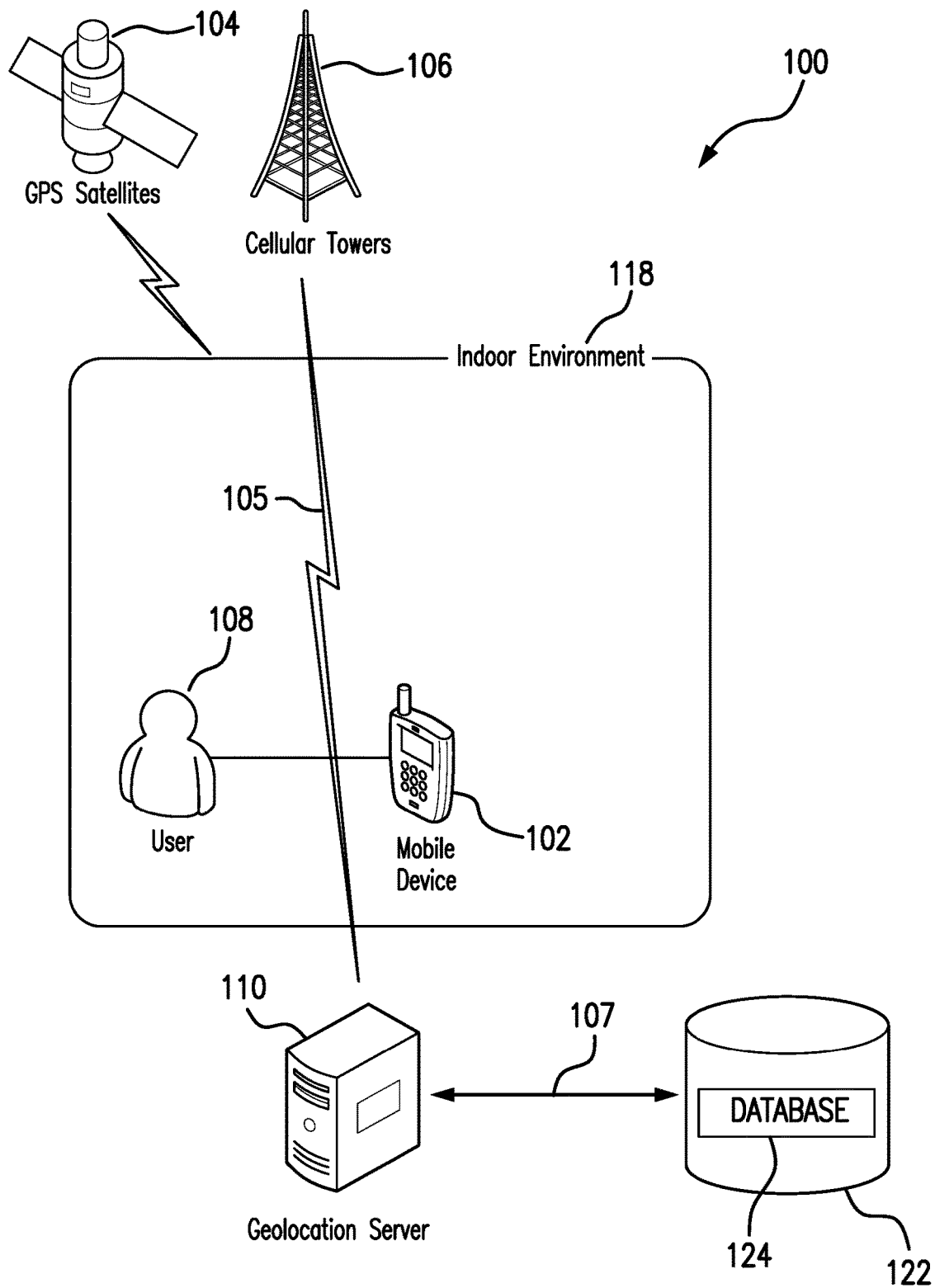
FIG. 1 illustrates an example communication network in accordance with an illustrated embodiment.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

The following detailed description is directed to network monitoring solutions that derive geolocation of a mobile device within a coverage area of a cellular communication network. Generally, UE-based network performance measurements (also called Minimization of Drive Test (MDT) measurements) are utilized for network performance monitoring and optimization purposes. However, information provided by the network performance measurements is somewhat limited. Typically, only measurement values known as TA of best serving cell (which provides the best coverage for an UE) and UE's Reference Signal Received Power (RSRP) are reported to various network monitoring solutions. It should be noted that, while TA values of best serving cell are relatively accurate measurements, granularity of such values in 4G networks is approximately 78 meters. RSRP is a cell-specific signal strength related metric that is used as an input for cell resection and handover decisions. For a particular cell, RSRP is defined as the average power (in dBm) of the Resource Elements (REs) that carry cell-specific Reference Signals (RSs) within the considered bandwidth. However, RSRP values can vary dramatically in a short period of time. Accordingly, it is not feasible to use only reported RSRP values by themselves for mobile device's geolocation prediction purposes. Thus, for many current and future location based applications, accuracy of the calculated geolocation position information should be improved. Advantageously, embodiments of the present invention contemplate methodology that can significantly increase the amount of available measurement samples that can be used to optimize or troubleshoot various network systems problems.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types.

FIG. 1 is a schematic block diagram of an example communication network 100 illustratively comprising nodes/devices (e.g., mobile devices, servers, routers, wireless stations, satellites, and the like) interconnected by various methods of communication. For instance, the links 105 may comprise a wireless communication medium, where certain nodes are in communication with other nodes, e.g., based on distance, signal strength, current operational status, location, etc. The links 107 may be wired links. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity.

FIG. 1 illustrates an exemplary network 100 in which an embodiment of the present invention may be implemented. The network 100 includes a mobile device 102 and a geolocation server 110. The geolocation server 110 may be configured to determine geolocation of the mobile device 102 as well as geolocation information corresponding to a plurality of other mobile devices (not shown in FIG. 1). The geolocation server 110 may enable geolocation determination by periodically receiving various measured values, such as, for example, signal strength measurements of signals transmitted from base stations 106. From this information, the geolocation server 110 determines accurate information related to the geolocation of the mobile device 102 as described below. The geolocation server 110 may send the geolocation information of interest to the mobile device 102. It is contemplated that the geolocation server 110 may have interaction capabilities with one or more data centers and/or servers belonging to various mobile application providers (not shown in FIG. 1) in order to enable the exchange of geolocation information.

The mobile device 102 also may receive signals from base stations 106 and/or GPS satellites 104. Base stations 106 may provide location information using triangulation or other methods described below. However, it is challenging to precisely determine mobile device's 102 location based on cell phone triangulation. Also, while GPS satellites 104 send signals that may be received by the mobile device 102 while it is outside of the indoor environment 118, GPS signals do not usually effectively reach such devices inside most indoor environments. It is noted that GPS signals are not being transmitted to the mobile device 102 over the air as such transmissions would drain batteries of the mobile device 102 rather quickly. In general, even if MDT is operational for a particular mobile device, the MDT approach only gives each mobile device 102 small amount of time to report GPS information. Subsequently, the MDT changes to idle mode for prolonged periods of time. Therefore, according to an embodiment of the present invention, rather than relying solely on GPS position information sources, a geolocation application 130, running, for example, on the geolocation server 110, as described herein, may utilize and combine the geolocation determination techniques described below in order to provide more accurate and reliable geolocation information, especially for indoor environments.

It is noted that the mobile device 102 is depicted in FIG. 1 as a mobile wireless device such as a cell phone or smart phone. However, it may be any portable device, such as a laptop, notebook, tablet computer, palm-sized computer, or any electronic device with capability to receive communication (i.e. wireless) signals.

Geolocation application 130 may comprise program instructions stored on one or more computer-readable storage devices, which may include internal storage on the geolocation server 110. Geolocation application 130 may be, for example, a computer program or program component for determining accurate geolocation information. Data gathered, generated, and maintained for use by the geolocation application 130 may be kept in the internal storage of the geolocation server 110 or in one or more databases 124 of a storage unit 122.

In one embodiment of the present invention, the mobile device 102 may comprise a conventional mobile user equipment (UE) device. Although not specifically shown, in this embodiment, the network 100 may include a radio access network (RAN) and a core network (CN). The RAN may include a number of base stations, each base station providing wireless access to a respective service coverage region. In alternative embodiments, the RAN may include other types of access points that include relays, femto-cells and pico-cells.

For purposes of the present patent application, the RAN may be implemented in any combination of known or heretofore unknown radio access technology and network protocols. For instance, the RAN may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, Device to Device (D-D), etc. The RAN can also be an aggregation of channels from multiple bands in the radio access technology LTE-A (Long Term Evolution-Advanced) or other 2G, 3G, 4G, 5G, etc. technologies either already developed or to be developed.

Figure 2:
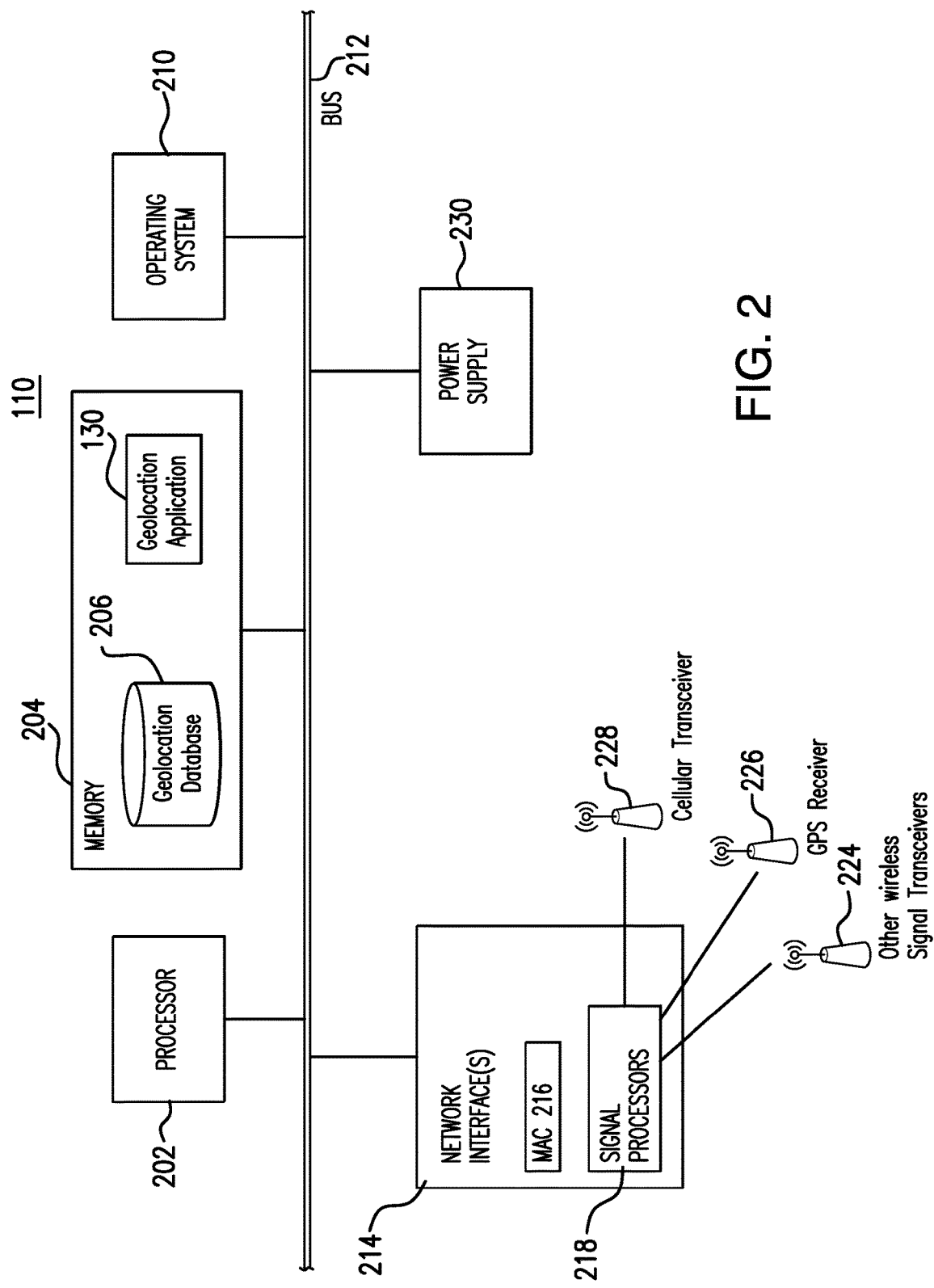
FIG. 2 is a schematic diagram of a geolocation server used in the system of FIG. 1 in accordance with an embodiment.

FIG. 2 is a schematic block diagram of an example geolocation server 110 that may be used with one or more embodiments described herein. The geolocation server 110 may comprise one or more network interfaces 214, at least one processor 202, and a memory 204 interconnected by a system bus 212.

FIG. 2 illustrates an alternative embodiment of the present invention. Unlike the embodiment illustrated in FIG. 1, this embodiment contemplates that the geolocation server 110, rather than the storage unit 122, stores the geolocation information. To do this, the memory 204 of the geolocation server 110 contains both a geolocation database 206 and the geolocation application 130. The memory 204 comprises a plurality of storage locations that are addressable by the processor 202, MAC 216, the network interfaces 214 and by the software programs associated with the embodiments described herein, such as the geolocation application 130. Geolocation application 130 may comprise program instructions stored on one or more computer-readable storage devices, which may include the memory 204 of the geolocation server 110. Geolocation application 130 may be, for example, a computer program or program component for determining accurate geolocation information. In one embodiment, the geolocation application 130 may include the GUI. The geolocation database 206 may store various geolocation information including described herein geolocation positioning data collected by the mobile device 102 from the plurality of position information sources 104-106 (shown in FIG. 1). The geolocation database 206 may also store processing results, such as generated characteristics maps described below. According to an embodiment of the present invention, the geolocation server 110 may store only a subset of the full geolocation information in its memory 204, based on predetermined configuration options, user input, or through other means.

The network interface(s) 214 may contain the mechanical, electrical, and signaling circuitry for controlling operation of the geolocation server 110 and may include a media access controller (MAC) 216, which can communicate data to/from network 100 using a variety of different communication protocols. According to various embodiments of the present invention, the geolocation server 110 may comprise several receivers and transceivers, including, but not limited to wireless RF signal receivers or transceivers 224, GPS receiver 226, and cellular transceiver 228. The network interface(s) 214 of the geolocation server 110 may also include signal processors 218, such as analog to digital converters, digital signal processors, or any such processor required to process and characterize the wireless signal received.

The one or more processor(s) 202 may comprise hardware elements or hardware logic adapted to execute the software programs and manipulate the data structures. The one or more processor(s) may receive information about the detected wireless signals through the signal processors 218 and may execute the geolocation application 130 stored in the memory 204 to determine accurate geolocation information.

An operating system 210, portions of which are typically resident in the memory 204 and executed by the processor 202 and/or network interfaces 214 (i.e., via MAC 216), functionally organizes the device by, inter alia, invoking operations in support of software processes and/or services executing on the geolocation server 110. A power supply 230 may be any of numerous types of stand-alone electrical power sources.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Illustratively, the techniques described herein may be performed by hardware, software, and/or firmware, such as in accordance with the geolocation application 130, which may contain computer executable instructions executed by the one or more processor(s) 202 (and/or MAC 212) to perform functions relating to the techniques described herein.

In many wireless networks, such as GSM, communications between mobile devices and base stations are supported by a physical channel and several logical channels. The physical channel is defined by frequency as well as by time. Uplink and downlink frequencies support duplex communication between the mobile devices and the wireless communication network, wherein each frequency includes repetitive time slot periods providing unique access points in time for an equal number of mobile devices. A mobile device in communication with a base station is assigned a time slot in an uplink frequency and a downlink frequency. The assigned time slots define the traffic channel for a mobile device.

One problem with these types of traffic channels is adjacent channel interference. For example, base station 106 transmits bursts to mobile device 102 over a time slot on the downlink frequency, and receives a related burst from the mobile device 102 over a time slot on the uplink frequency, wherein the uplink time slot occurs three time slots after the downlink time slot. However, due to propagation delay, the uplink burst may not completely arrive within the confines of the expected uplink time slot, e.g., the uplink burst may arrive in the expected uplink time slot and the subsequent uplink time slot, thereby causing adjacent channel interference.

To account for propagation delay, a timing advance (TA) value is assigned to mobile device 102 and used to reposition the uplink burst such that it arrives at base station 106 in the expected uplink time slot, wherein the timing advance value varies as a function of distance between the base station and the mobile device. For example, the TA value is calculated by the base station 106 and sent to the mobile device 102 in a control message. The TA value is subsequently used by the mobile device 102 to reposition the uplink burst such that the uplink burst is transmitted at a time corresponding to the TA value prior to the uplink time slot, i.e., uplink burst is transmitted time t (TA) before the start of the uplink time slot. The manner of determining the TA value for a particular mobile device is well-known in the art. By successful extraction of these control messages from the air interface, a distance from the base station to the mobile device can be derived based on propagation speed and how many units of timing advance the base station indicates to the mobile device to use.

Figure 3:
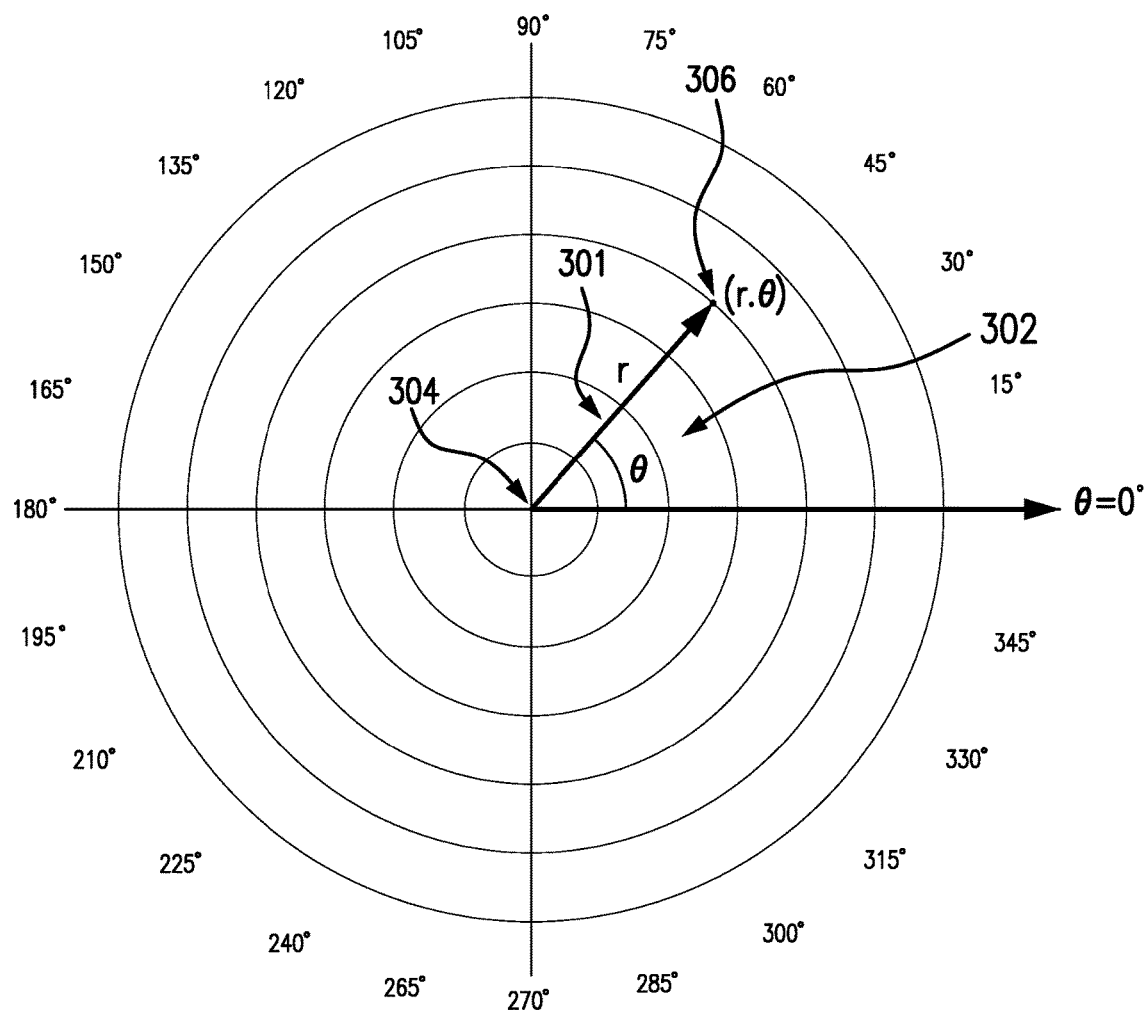
FIG. 3 depicts an example of using timing advance values to determine the location of a mobile device.

Timing advance principles are used along with signal strength measurements to provide a location determination. FIG. 3 depicts an example of using timing advance values to determine the location of a mobile device. In this example, base station 106 at position 304 determines a TA value for mobile device 102 at position 306. The radius 301 and angle 302 values are used to determine the distance between corresponding positions of the base station and the mobile device. Inaccurate information about the angle 302 typically leads to significant errors in geolocation determination. Other parameters pertinent to call status which are contained in a link status record (LSR) may be used for geolocation determination. Such parameters may include, but are not limited to, base station RSRP, Net IDs (NIDs) and their order in measurement reports, previous serving sector prior to handover procedure, and the like. However, these parameters are still used for distance estimations in conjunction with timing advance principles.

Figure 4:
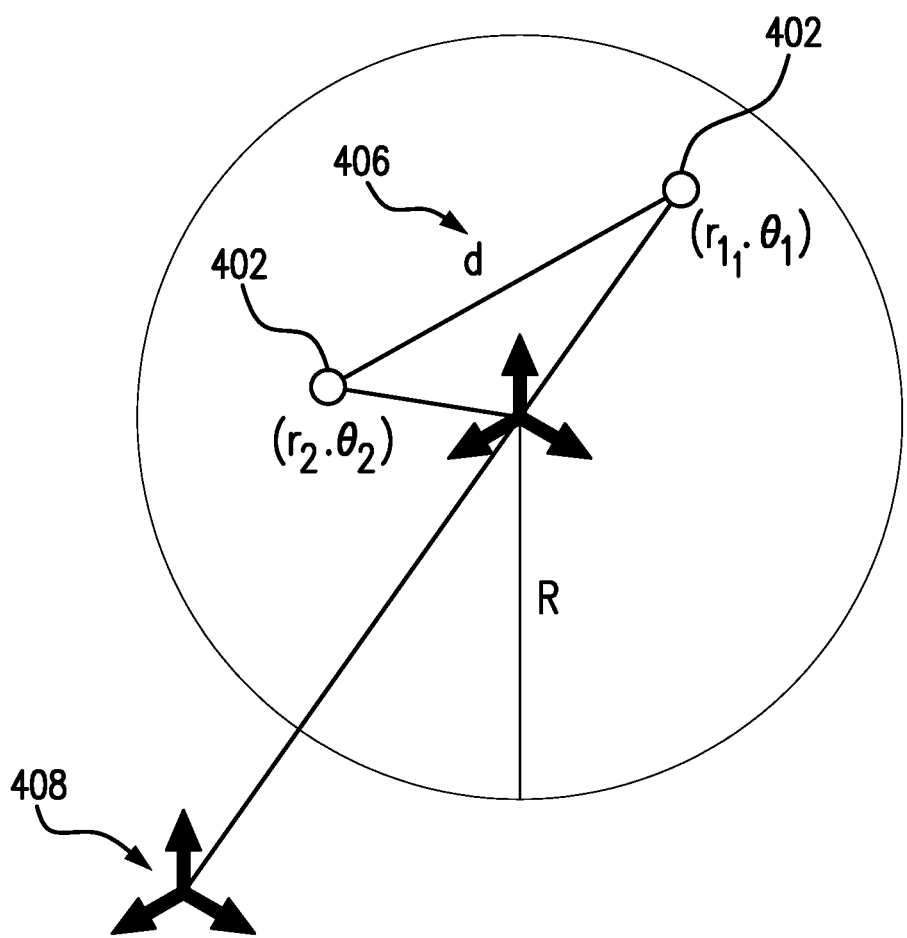
FIG. 4 is a diagram illustrating errors in calculation of distance between a base station and a mobile device using TA principles.

FIG. 4 is a diagram illustrating errors in calculation of distance between a base station and a mobile device using TA principles. For purposes of example, assume that GPS location of a first position 402 is known and assume that timing advance principles are utilized to determine geolocation of a second position 401. The distance 406 between the first position 402 and the second position 401 can be expressed as:

$$d = \sqrt{(y2-y1)^2 + (x2-x1)^2} = \qquad (1)$$
$$\sqrt{(r2*\sin\theta2 - r1*\sin\theta1)^2 + (r2*\cos\theta2 - r1*\cos\theta1)^2} =$$
$$\sqrt{r1^2 + r2^2 - 2r1r2*\cos(\theta1-\theta2)},$$

where r1 and r2 are radial distances and θ1 and θ2 are polar angles of the first position 402 and the second position 401, respectively.

In cases where both rs and θs are unknown, the expected error for the distance 406 is given by:

$$\langle d \rangle = \frac{\int_0^R \int_0^R \int_{\theta11}^{\theta12} \int_{\theta21}^{\theta22} \sqrt{r1^2+r2^2-2r1r2*\cos(\theta1-\theta2)}\ d\theta2d\theta1dr2dr1}{R2*(\theta12-\theta11)*(\theta22-\theta21)}. \qquad (2)$$

In cases where $r_2 = r_1$ and θs are unknown, the expected error for the distance 406 is given by:

$$\langle d \rangle = \frac{\int_0^R \int_{\theta11}^{\theta12} \int_{\theta21}^{\theta22} \sqrt{2r^2-2r^2*\cos(\theta1-\theta2)}\ d\theta2d\theta1dr}{R*(\theta12-\theta11)*(\theta22-\theta21)}. \qquad (3)$$

In FIG. 4, reference numeral 408 denotes inter-site distance (ISD) between serving sectors. The second position 401 represents an estimated position for the mobile device, which is operating within the coverage area of its serving sector. For purposes of example, assume that R is designated as 60% of the average ISD 408 and assume that all geographic sites have three sectors (coverage of each sector covers 120 degrees). Based on these assumptions, the expected errors (2) and (3) can be expressed as:

In cases where both rs and θs are unknown, <d>=about 30% of ISD (4)

In cases where $r_2 = r_1$ and θs is unknown, <d>=about 20% of ISD (5)

In this example, the best achievable mean error of estimated position of the mobile device is designated as twenty percent of the average inter-site distance on the heading of the serving sector. The average inter-site distance is defined as the average of the distances from the closest site to each of the sites in a given boundary. Accordingly, in order to get more accurate estimated position of a mobile device other information is needed in addition to TA values. Other issues that are addressed by embodiments of the present invention include improved geolocation calculation speed, capability to approximate location of mobile devices within the estimated coverage area of the base station sector that deploys the distributed antenna system (DAS) and capability to approximate location of mobile devices within the estimated coverage area of the base station sector that deploys splitted antenna system, among others.

Figure 5:
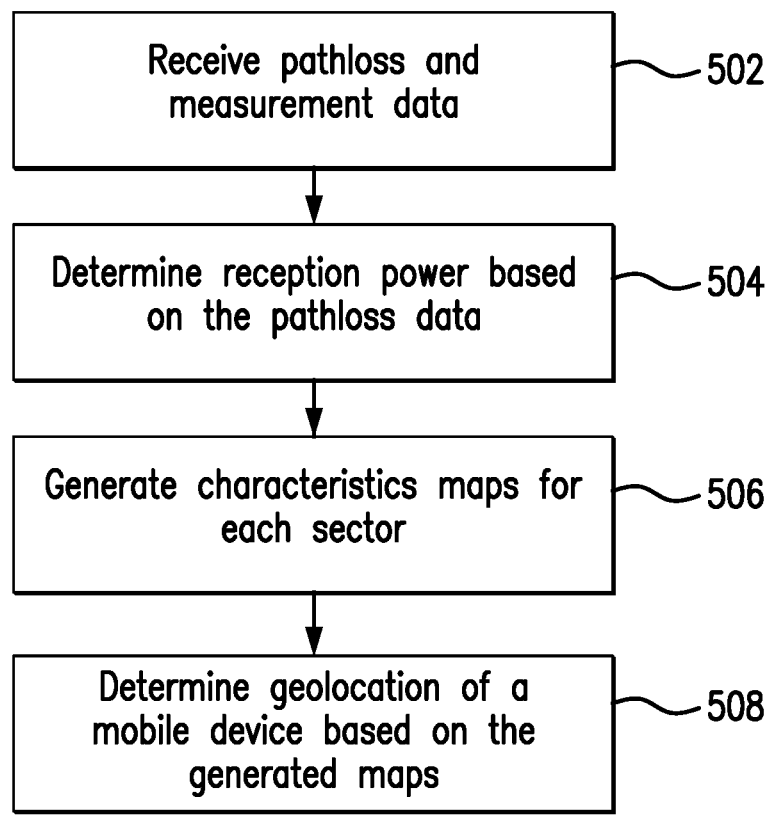
FIG. 5 is a flowchart illustrating operation of an embodiment of the present invention.

FIG. 5 is a flowchart illustrating operation of an embodiment of the present invention. Before turning to description of FIG. 5, it is noted that the flow diagram shown therein is described, by way of example, with reference to steps and/or elements shown in FIGS. 6, 7 and 8A-8D, although these operational steps may be carried out in any system and are not limited to the scenario shown in the aforementioned figure. Additionally, the flow diagram in FIG. 5 illustrates an example in which operational steps are carried out in a particular order, as indicated by the lines connecting the blocks, but the various steps shown in this diagram can be performed in any order, or in any combination or subcombination. It should be appreciated that in some embodiments some of the steps described below may be combined into a single step. In some embodiments, one or more additional steps may be included.

According to an embodiment of the disclosure, each base station may monitor path loss based on the uplink data received from the mobile device. Each serving base station may determine a set of neighbor base stations based on the path loss monitored by each base station. The term "neighbor base station" refers to a base station that may interfere with data transmission and reception between the mobile device and the serving base station. In case there are too many mobile devices served by the base station, the base station may select only a specific mobile device to identify the interference, overhear the uplink data transmitted from the selected terminal, and measure a path loss. Uplink transmission may be put in use to measure interference to the mobile device from the base station. Measured information (e.g., path loss value) may be transmitted by the serving base station to the geolocation server 110.

At step 502, the geolocation application 130 receives path loss measurements together with predicted path losses at a set of locations as predicted by a calibrated path loss model, which may be hosted by the geolocation server 110, for example. Example geolocation application 130 facilitates correction of wireless signal propagation information. In an embodiment, geolocation application component 130 can include a model selector that extracts a propagation model for wireless signal, e.g., RF signal. Service area of a monitored wireless network may be partitioned into cells, where mobile devices communicate, via radio links, with the base station serving the cell. The cells can be further partitioned into sectors. It should be noted that different propagation models have different scope, some are for the urban environment, while others are for the suburbs. Each propagation model applies only within a certain frequency range, distance, and antenna height range. Selection of the appropriate propagation model for a particular sector may affect the accuracy of geolocation determination. The selected propagation model can be utilized in conjunction with propagation timing delay among wireless signals, e.g., signaling or traffic, delivered and received, respectively, by a base station.

At least in some embodiments, the actual wireless propagation can be approximated by introducing virtual distance. More specifically, base stations collect the measurement of transmission power and received power, and then approximate the actual wireless propagation. Then the power assignment is applied to the virtual distances and virtual attenuation factor. Conceptually, this is similar to Internet distance embedding (see, e.g., GNP T. S. E. Ng and H. Zhang, Predicting Internet network distance with coordinates-based approaches, In Proc. of IEEE INFOCOM, June 2002), which embeds a complicated Internet space onto a simple geometric space. In the present case, a complicated space is embedded, which describes actual wireless propagation, onto a simpler space that follows.

In one embodiment, the geolocation application 130 may divide the measurement area of interest into a grid. A grid may be used to optimize data collection and sampling rates in a model. A bin is one cell of the grid. The grid size and shape can vary. Varying shapes and densities of geographic bins within a grid are possible and sometimes useful for dense distributions of data within a monitored wireless network.

At step 504, the geolocation application 130 performs analysis of data received at step 502 to determine reception power for each sector. In other words the geolocation application 130 translates received path loss values into reception power values. Generally, reception power values can be expressed as:

$$\text{Reception power} = \text{transmit power} + \text{gains} - \text{losses} \qquad (6)$$

In one embodiment, the geolocation application 130 translates path loss values into RSRP values. Data analysis of step 504 includes the process of binning average RSRP values within each grid cell to generate an average reception power (RSRP) value associated with each bin. Therefore, each bin location analyzed has a single RSRP data value representing all the RSRP values within that particular bin location. The averaging of the RSRP data reduces distortions which could result from a greater number of measurements in some areas and a lesser concentration of measurements in other areas.

Data analysis of step 504 may further include generation of additional information for each bin. For example, data analysis of step 504 can include, for each of the plurality of geographic bins and for each of a plurality of frequency bands on a downlink channel, calculating a best server RSRP value and deriving a corresponding carrier to interference and noise ratio (CINR) value and a corresponding interfering signal received power (ISRP) value. As another non-limiting example, the geolocation application 130 may derive a best server TA value based on a determined distance between that particular bin location and a corresponding base station location. At least in some embodiments, the geolocation application 130 may also generate terrain, clutter, street and user mobility information for each bin. Data analysis of step 504 may also include generation of coverage maps for each sector by overlaying a plurality of RSRP maps.

Figure 6:
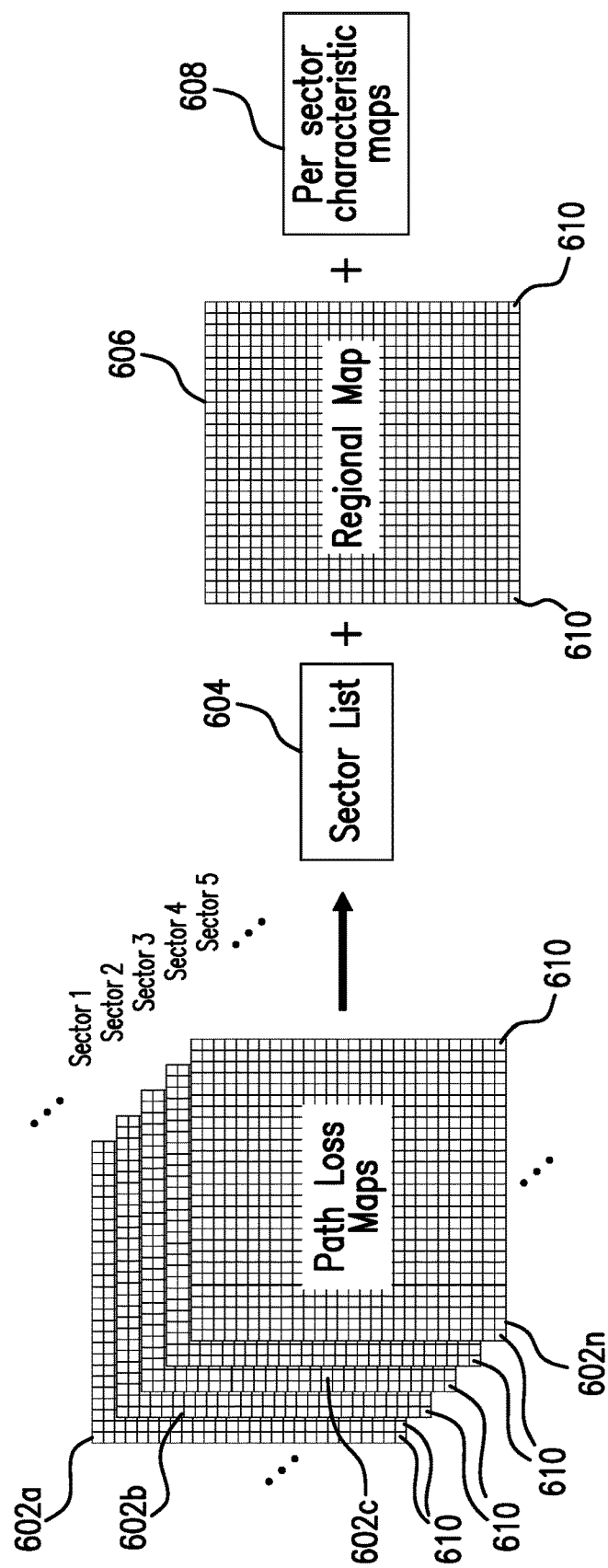
FIG. 6 is a diagram illustrating a step of generating sector characteristic maps for each geographical sector of interest in accordance with an illustrated embodiment.

According to an embodiment of the present invention, at step 506, the geolocation application 130 generates characteristics maps for each sector. FIG. 6 is a diagram illustrating the step of generating sector characteristic maps for each sector in accordance with an illustrated embodiment. In this exemplary embodiment, the geolocation application 130 utilizes the plurality of representative path loss maps 602a-602n as input. Each of the plurality of path loss maps 602a-602n represents one sector. As shown in FIG. 6, the geolocation application 130 may overlay the plurality of representative path loss maps 602a-602n to generate a larger regional map 606. The larger regional map 606 includes all of the geographic bins 610 from each of the plurality of path loss maps 602a-602n. It should be noted that the geolocation application 130 maintains a list of sectors 604 included in the larger regional map 606 and maintains one or more bin identifiers for each bin 610 included in the larger regional map 606. At least in some embodiments, bin identifier information may include geographical information, such as latitude and longitude, a sector corresponding number (from the sector list 604), and the like. Step 506 (shown in FIG. 5) further involves generation of a plurality of characteristic maps 608 by the geolocation application 130. Each characteristic map 608 is representative of a particular sector.

Figure 7:
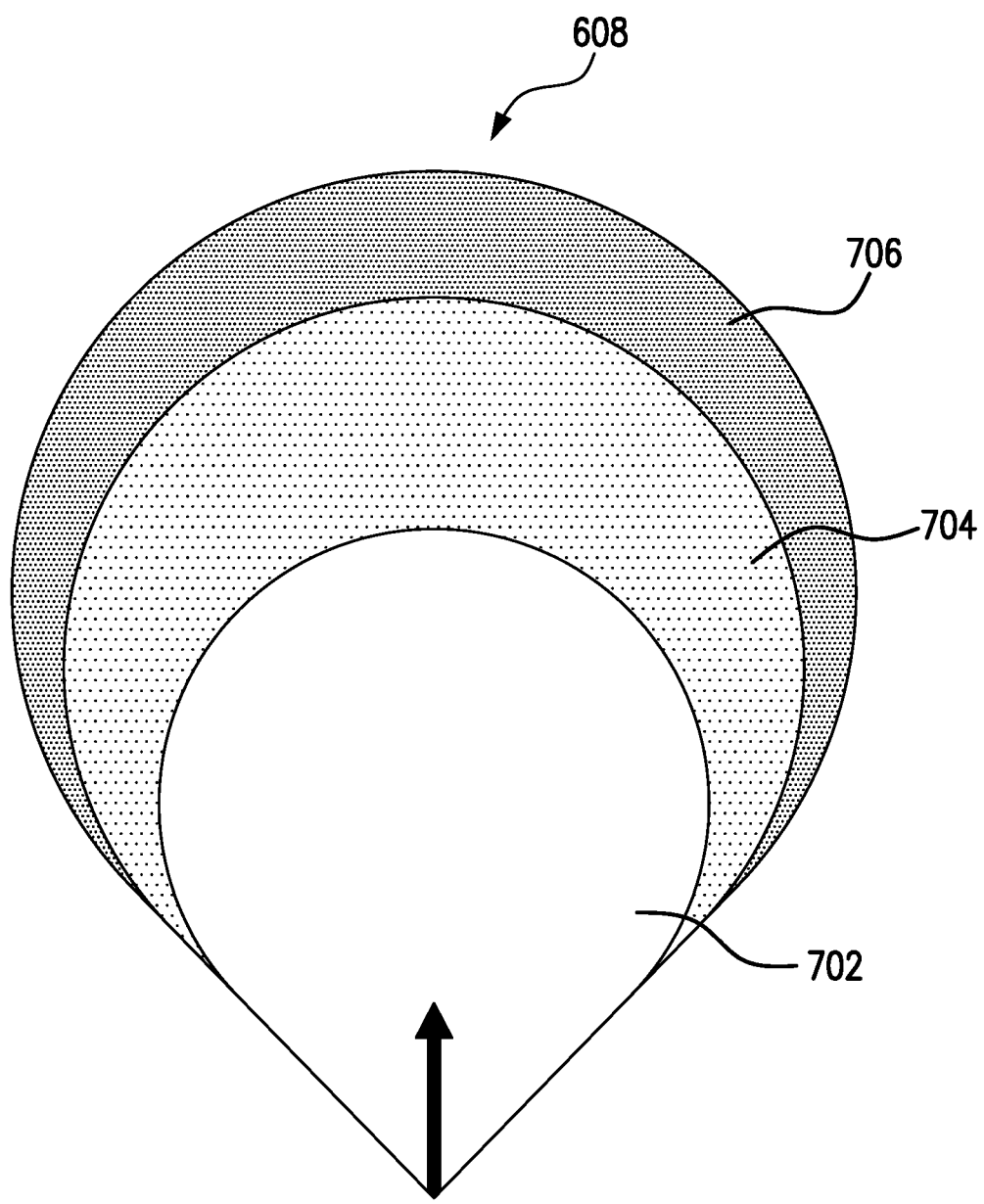
FIG. 7 is a diagram of an exemplary sector characteristic map in accordance with an illustrated embodiment.

FIG. 7 is a diagram of an exemplary sector characteristic map in accordance with an illustrated embodiment. In the illustrated embodiment, the characteristic map 608 includes a plurality of regions 702-706 of a cell. In this particular example, the plurality of cell regions 702-706 includes three different regions. A first region 702 comprises cell center inner region. A second region 704 comprises cell center outer region 704 and a third region 706 comprises cell edge region. Each region comprises a plurality of geographic bins 610 that are grouped together based on one or more characteristics. In the illustrated embodiment such characteristic is RSRP values. More specifically, the first region 702 includes all geographic bins where $RSRP_{BS}-RSRP_{N1}>$second threshold; the second region 704 includes all geographic bins where first threshold$\leq RSRP_{BS}-RSRP_{N1}\leq$second threshold; and the third region 706 includes all geographic bins where $RSRP_{BS}-RSRP_{N1}<$first threshold. Here, $RSRP_{BS}$ represents RSRP value as measured by a corresponding base station and $RSRP_{N1}$ represents RSRP value of a strongest neighbor radio cell $N_1$. The first region 702 represents a plurality of geographic bins where the best serving cell is the dominant server providing higher network signal level. The first region 702 typically has the lowest expected number of handover procedures to a neighboring cell. The second region 704 represents a plurality of geographic bins where network signals from different cells are substantially similar. The second region 704 has a substantially higher number of expected handover procedures. The third region 706 includes a plurality of geographic bins that might be included in two or more overlapping sectors and where the signal from the serving cell is considered an inter-sector interference for other neighboring sectors. It should be noted that values of the first and second threshold are not fixed and may vary from carrier to carrier and/or from region to region. In one non-limiting embodiment, the first threshold may have a value of −3 dB while the second threshold may have a value of 3 dB.

Step 506 (shown in FIG. 5) may further involve generation and storage of mappings between the plurality of individual bin identifiers and corresponding values and/or corresponding regions 702-706 in the geolocation database 206 by the geolocation application 130. For example, the geolocation application 130 may store in the geolocation database 206 a plurality of mappings between individual geographic bins and corresponding base station RSRP values and/or a plurality of mappings between individual geographic bins and corresponding neighboring cell identifiers. As another non-limiting example, the geolocation application 130 may store in the geolocation database 206 a plurality of mappings between a list of geographic bins included in a particular region of the plurality of regions 702-706 and corresponding characteristic values (e.g., TA values, RSRP values). In some embodiments, the aforementioned mappings may also be grouped based on a mobility status. In other words, at least in some embodiments, the geolocation database 206 may contain two separate tables, where a first table stores mappings between a list of geographic bins and corresponding characteristic values of mobile UE devices within a particular region 702-706, while a second table stores mappings between a list of geographic bins and corresponding characteristic values of stationary UE devices within the same particular region 702-706.

Referring back to FIG. 5, according to an embodiment of the present invention, at step 508, the geolocation application 130 performs estimation of a geolocation of a mobile device of interest based on the sector characteristics maps generated in step 506. The geolocation estimation step 508 may involve determining mobility status of the mobile device of interest (e.g., whether the mobile device of interest is stationary or mobile), and calculating confidence level of whether the corresponding call should be placed in a particular region or not. The geolocation estimation step 508 further involves identifying sector and particular regions, such as regions 702-706 shown in FIG. 7, (within the identified sectors) containing a plurality of geographic bins having particular characteristic values that match measured values of the mobile device of interest. According to an embodiment of the present invention, after a plurality of candidate geographic bins is identified, the geolocation application 130 may also select one of the plurality of candidate geographic bins that best matches the most likely position of the mobile device of interest.

Figure 8A:
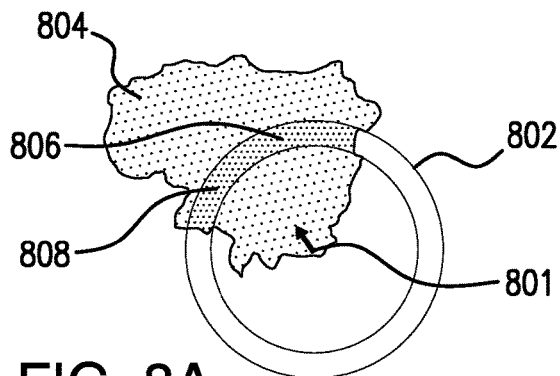
FIGS. 8A-8D are diagrams illustrating a method of determining geolocation of the mobile device based on the generated plurality of sector characteristics maps in accordance with an illustrated embodiment.

FIGS. 8A-8D are diagrams illustrating a method of determining geolocation of the mobile device based on the generated plurality of sector characteristics maps in accordance with an illustrated embodiment. Largely because of the discrete nature of the TA value, a single measurement from a base station will reduce the possible location of the mobile device of interest to an annulus of fixed width. This annulus 802, with the base station as its center 801, is shown in FIG. 8A. In other words, annulus 802 represents a call having a measured TA value. In addition, region 804 depicted in FIG. 8A represents the area in which this sector has network signal. For example, in LTE networks the minimum transmitted signal level is −140 dBm, so in an LTE network, region 804 has signal level >−140 dBm. The area 806 where regions 802 and 804 intersect represents the area the call should be located within. According to an embodiment of the present invention, if TA value of the mobile device of interest is not available, the geolocation application 130 may randomly select a bin contained within the cell center inner or outer region. Alternatively, if the annulus 802 represents measured TA value of the mobile device of interest, the geolocation application 130 may randomly select one of the geographic bins having a TA value matching mobile device's TA value within the intersection of the annulus 802 and the region 804, such as, for example, bin 808 shown in FIG. 8A. It should be noted that the aforementioned selection procedure may be also be used by the geolocation application 130 if RSRP value of the mobile device of interest is not available.

Figure 8B:
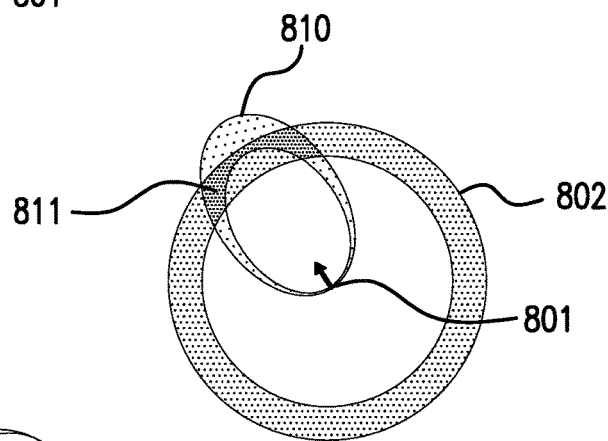

FIG. 8B illustrates a case where both RSRP values of the mobile device of interest and of the serving base station are available. In FIG. 8B, the first annulus 802 still represents potential locations corresponding to measured TA values of the mobile device of interest while a second annulus 810 represents an approximated shape of coverage area at a signal level or within a few signal levels (e.g., shape of coverage with signal level between −90 to −100 dBm). The area 811 where regions 802 and 810 intersect represents the area the call should be located within and is a more accurate version of area 806 shown in FIG. 8A. In this case, the geolocation application 130 randomly selects one of the geographic bins located within the intersection 811 of the first annulus 802 and the second annulus 810.

Figure 8C:
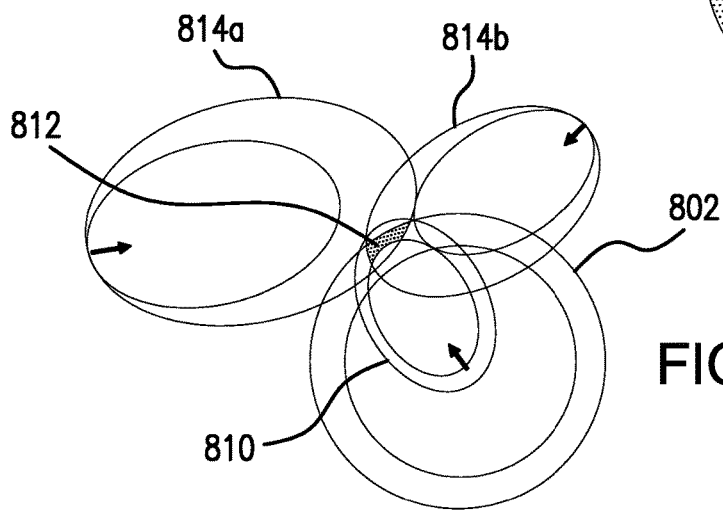

FIG. 8C illustrates a more general case having more than one sector where RSRP measurements of neighboring cells are available as well. In FIG. 8C, the first annulus 802 still represents potential locations corresponding to measured TA values, the second annulus 810 represents potential locations corresponding to measured RSRP values of the serving base station, while a third annulus 814a and a fourth annulus 814b represent potential locations corresponding to measured RSRP values of the base stations serving neighboring cells. Advantageously, in this case the geolocation application 130 randomly selects one of the geographic bins located within a much smaller area of the intersection 812 (as compared to area 811) of the first annulus 802, second annulus 811, third annulus 814*a* and the fourth annulus 814*b*. In reality, the area 812 is not necessarily a specific geometrical shape and can often have a plurality of different components. Accordingly, geolocation estimation performed by the geolocation application 130 is better than performance of purely statistical analysis models because the geolocation application 130 uses more accurate data as described herein.

Figure 8D:
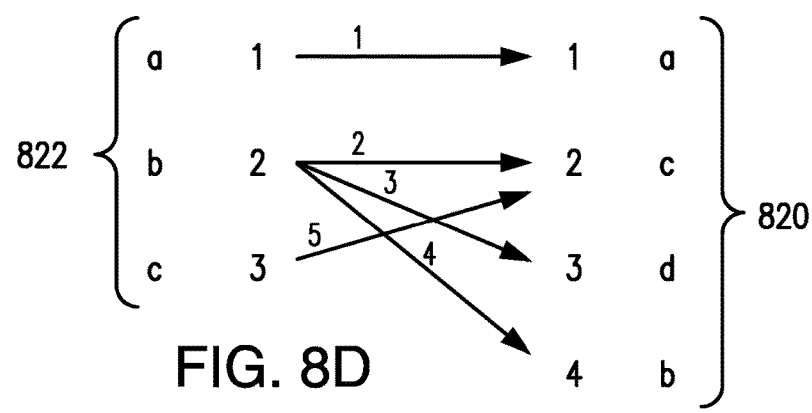

Once a plurality of candidate geographic bins is selected based on the procedures illustrated in FIG. 8C, the geolocation application 130 determines an estimated location of the mobile device of interest by identifying geographic bins with the most similar order of NIDs to determine estimation confidence level. In FIG. 8D, assume an illustrative call 822 is in the area of intersection of sectors a, b and c ranked by measured signal strength 1-3, where 1 represents the strongest signal. The geolocation application 130 selects geographic bins inside the intersection area 812 (see FIG. 8B) one by one. An illustrative geographic bin 820 is at intersection of sectors a, c, d, b also ranked by predicted signal level. As shown in FIG. 8D, the geolocation application 130 would need five steps (represented as arrows) to match call 822 to the geographic bin 820. If the geolocation application 130 finds one or more geographic bins inside the intersection area 812 that would take four steps or less to match the call then those geographic bins will have a higher confidence level value, as compared to the geographic bin 820. The geolocation application 130 selects the geographic bin (within the area 812) having the highest confidence level value as the estimated geolocation of the mobile device of interest.

In view of the above, embodiments of the present invention enable the network monitoring system to perform faster and more accurate mobile device's of interest geolocation determination using power fingerprinting techniques. More specifically, these embodiments disclose a method utilizing novel combination of wireless signal measurements capable of more accurately predicting mobile device's location. This new method can benefit service providers in improving their network quality and can help improving user experience resulting in an improved customer royalty.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for deriving geolocation of a mobile device within a coverage area of a cellular communication network, the method comprising:
   receiving pathloss data and measurement data associated with a plurality of individual sectors within a plurality of individual cells of the cellular communication network, each of the plurality of individual sectors comprising a plurality of geographic bins;
   determining one or more reception power measurements for each of the plurality of geographic bins;
   generating a plurality of maps including two or more regions of one of the plurality of individual cells for each of the plurality of individual sectors based on at least one characteristic included in the received pathloss data or measurement data or based on the determined one or more reception power measurements, wherein the two or more cell regions include at least inner cell center region, outer cell center region and cell edge region and wherein each of the two or more cell regions includes a plurality of geographic bins grouped together based on one or more measurements and wherein the plurality of maps associates each bin of the plurality of geographic bins with at least one of neighbor cell information, time advance information and best network server information and wherein the associations are stored in a data repository; and
   determining geolocation of the mobile device based on the generated plurality of maps, wherein determining geolocation of the mobile device comprises selecting a subset of geographic bins from the plurality of geographic bins based on at least some of the neighbor cell information, the time advance information and the best network server information contained within the generated plurality of maps.

2. The method of claim 1, wherein the two or more regions are determined based on a determined average RSRP measurements of geographic bins included in the corresponding region.

3. The method of claim 1, wherein determining geolocation of the mobile device further comprises identifying one or more geographic bins from the selected subset of geographic bins based on an order of neighbor cell identifiers.

4. The method of claim 1, wherein the two or more cell regions are generated in response to determining that the one or more measurements associated with geographic bins included in the corresponding region are in a predetermined relationship with one or more predetermined thresholds.

5. The method of claim 1, wherein the plurality of maps associates each bin of the plurality of geographic bins with mobility status of a corresponding mobile device.

6. A network device for deriving geolocation of a mobile device within a coverage area of a cellular communication network, the network device is configured to:
   receive pathloss data and measurement data associated with a plurality of individual sectors within a plurality of individual cells of the cellular communication network, each of the plurality of individual sectors comprising a plurality of geographic bins;
   determine one or more reception power measurements for each of the plurality of geographic bins;
   generate a plurality of maps for each of the plurality of individual sectors based on at least one characteristic included in the received pathloss data or measurement data or based on the determined one or more reception power measurements, wherein each of the plurality of maps includes two or more regions of one of the plurality of individual cells and wherein the two or more cell regions comprise at least inner cell center region, outer cell center region and cell edge region and wherein each of the two or more cell regions comprises a plurality of geographic bins grouped together based on one or more measurements; and
   determine geolocation of the mobile device based on the generated plurality of maps and select a subset of geographic bins from the plurality of geographic bins based on at least some of neighbor cell information, time advance information and best network server information contained within the generated plurality of maps, wherein the plurality of maps associates each bin of the plurality of geographic bins with at least one of neighbor cell information, time advance information and best network server information and wherein the associations are stored in a data repository.

7. The network device of claim 6, wherein the two or more regions are determined based on a determined average RSRP measurements of geographic bins included in the corresponding region.

8. The network device of claim 6, wherein the network device configured to determine geolocation of the mobile device further comprises the network device configured to identify one or more geographic bins from the selected subset of geographic bins based on an order of neighbor cell identifiers.

9. The device of claim 6, wherein the two or more cell regions are generated in response to determining that the one or more measurements associated with geographic bins included in the corresponding region are in a predetermined relationship with one or more predetermined thresholds.

10. The device of claim 6, wherein the plurality of maps associates each bin of the plurality of geographic bins with mobility status of a corresponding mobile device.

* * * * *